Patented Nov. 3, 1931

1,829,822

UNITED STATES PATENT OFFICE

HENRY DREYFUS, OF LONDON, ENGLAND

MANUFACTURE OF CELLULOSE ACETATE

No Drawing. Original application filed April 18, 1923, Serial No. 633,016, and in Great Britain May 24, 1922. Divided and this application filed January 20, 1926. Serial No. 82,623.

This application is a division of the application of Henry Dreyfus, S. No. 633,016 filed April 18, 1923 which has eventuated into Patent No. 1,708,787 on April 9, 1929.

This invention relates to the manufacture of cellulose acetate, from cellulose or its near conversion products, which latter are hereinafter included under the term cellulose.

In previous U. S. Patents Nos. 1,278,885; 1,280,974 and 1,280,975 and British Patents 14,101 of 1915, 6,463 of 1915, 101,555 and 100,009, I have described processes for the manufacture of cellulose acetates which are very viscous and produce very viscous solutions.

The present invention aims to make new cellulose acetates, which are more viscous than the products obtained according to my said patents or any known process, and capable of giving whether as primary esterification products or products of further transformation, stronger and better artificial silk or other technical products than any heretofore obtainable with fatty acid esters of cellulose.

Hitherto acetic acid (about 4 to 6 times the weight of cellulose) has been used as a solvent in the process of acetylating cellulose. In these processes acetic anhydride to the extent of 1½ to 6 times the weight of the cellulose is used, the amount of the acetic anhydride usually varying inversely with the amount of acetic acid used (usually the less acetic acid used the more anhydride).

The applicant has discovered that the acetic acid plays an important part in the production of very viscous products and does not serve merely as a solvent or diluent as has hitherto been supposed. This is evidenced by the fact that the acetylation solution obtained by the applicant's process hereinafter described is at least as viscous as the acetylation solution obtained under otherwise similar conditions by prior processes, although the dilution may be at least 2 to 3 times as great or more.

The applicant has also found that the quantity of acetic anhydride taken in excess of that required for the acetylation also plays an important part.

According to the present invention the ratio of acetic acid used in the acetylation or esterification is increased from the customary about 4 to 6 parts of acetic acid to 1 part of cellulose to, for example, to about 8 to 12 and preferably even substantially more parts of acetic acid to 1 part of cellulose. This increase in the amount of acetic acid used not only results in a purer and more viscous product but it enables the esterification to be more easily controlled and hinders the depolymerization of the cellulose molecule.

The use of an increased proportion of acetic acid in conjunction with sulphuric acid or other strong condensing agents in the acetylation of cellulose forms the subject matter of the parent specification S. No. 633,016.

In accordance with the present invention, the vigorous evolution of heat that takes place when a strong condensing agent is used, is avoided by the use in conjunction with an increased proportion of acetic acid, as aforesaid, of weak or relatively weak condensing agents, for example bisulphates containing small proportions of sulphuric acid as explained in my U. S. Patent 1,280,974 and my British Patent 100,009, or bisulphates alone, or sulphates like aniline sulphate, or ammonium sulphate or ammonium bisulphate, or any other weak condensing agent capable of promoting acetylation at an appropriate temperature.

When weak condensing agents and especially small quantities of them are used, quantities of acetic anhydride in excess of that necessary for the required acetylation can be used without danger of the destructive action which excess acetic anhydride exerts on the cellulose in the presence of strong condensing agents like sulphuric acid.

If, for example, one takes any increased quantity of acetic acid, for instance 8 times the weight of the cellulose, while not substantially increasing the quantity of acetic anhydride, it will be found that, following similar conditions to those explained in my above mentioned U. S. Patent 1,280,974 or British Patent 100,009, solutions can be obtained which are just as viscous, in spite of their increased dilution, as the solutions obtained with much less acetic acid, for example only four times the weight of the cellulose.

The quantity of acetic acid is preferably increased to more than 8 times the weight of the cellulose, e. g. to 10 or 12 times and more as desired, products of increased viscosity being thus obtained: or with less advantage less than 8 times the weight relatively to the cellulose may be employed.

Coupled with the use of weak condensing agents, the dilution with acetic acid has a further advantage in that the control of the heat evolved by the reaction, which is very great when sulphuric acid or strong condensing agents are used, is much more in hand and can be regulated much more easily. When, for the acetylation, condensing agents are used which necessitate higher temperatures for the reaction, the conditions have to be adapted. Thus in the case of ammonium sulphate or sodium bisulphate the application of heat becomes necessary.

In addition to a more efficient temperature control, the use of an increased amount of acetic acid also enables the hydration of the cellulose before the actual acetylation sets in to be more easily regulated—this without attacking or substantially attacking the cellulose.

The increased dilution also permits a higher temperature to be used (although less advantageously) for starting up, for example, one need not cool down so much, or one can work at ordinary temperature with water cooling, or according to the amount of dilution, even without cooling, as the small rise in temperature which may then take place does not have such a detrimental effect, or one may heat to higher temperatures, even to boiling point, according to the weakness of the condensing agent used.

It is to be understood that acetic acid as solvent for the acetylation may be wholly or partly replaced by other suitable acids or solvents, or that acetic acid or such other acids or solvents may be partly replaced by solvents or liquids such as chloroform or tetrachlorethane or even diluents such as carbon tetrachloride, trichlorethylene, benzol, etc., so long as with such solvents, diluents or mixtures one is able to get a solution by acetylation; but the employment of such other solvents or diluents is not so advantageous as the use of acetic acid alone as solvent. Solvents or diluents that are capable of being converted into esters by means of fatty acid anhydrides are obviously unsuitable for use in this present process. The solvents, or solvent mixtures above referred to must be employed in such quantities as give an increased or greatly increased dilution of the esterification mass as compared with the quantity of acetic acid hitherto usually employed.

The acetic anhydride of the applicant's process can be replaced by other anhydrides of fatty acids to produce the corresponding cellulose esters.

If the acetylation is performed with larger quantities of acetic anhydride or with acetic anhydride alone, for example, if instead of taking acetic acid in an amount 8 times the weight of the cellulose, plus acetic anhydride in an amount 2½ times the weight of the cellulose, making a total of 10½ times liquor relatively to the weight of the cellulose, one takes acetic anhydride alone in this total amount, one will observe that the acetylation solution so produced with strong condensing agents is relatively very thin. This however is less pronounced when much weaker condensing agents are used which may even require some heating, especially if used in small quantity.

The final quality of product obtained, especially from a viscosity point of view, accordingly is substantially improved by the use of weak condensing agents instead of strong condensing agents when acetic anhydride is used in substantial excess of the amount necessary for real acetylation. With sulphuric acid it seems that the acetic anhydride acts very quickly in a depolymerizing and degrading manner on the cellulose.

If acetic anhydride is used in a big excess, e. g. in amounts 4, 5 or 6 times the weight of the cellulose, with acetic acid in amount of about 4 times the weight of the cellulose, and particularly when acetic anhydride is used alone in large excess it is preferable in order to get highly viscous acetylation products, to use very weak condensing agents, for example condensing agents in which the sulphuric acid is completely neutralized to a salt, as in ammonium sulphate, in which case a higher temperature is used for acetylation and the quantities of condensing agent are preferably substantially reduced.

The best results however appear to be obtained when the quantity of acetic anhydride is just that necessary for acetylation, or no substantial excess, for example between about 1.5 and 3, and preferably between about 1.8 and 2½ times the weight of the cellulose, the exact quantity being each time determined by the reaction, inasmuch as differences of humidity in the cellulose and acetic anhydride percentage and percentage of acetic acid are best ascertained by the acetylation reaction. As shown by comparison of results, the products obtained with a minimum quantity of acetic anhydride are much more viscous.

Inasmuch as the reaction can be mastered much more easily, higher quantities of condensing agent than usual can be employed with much more ease, e. g. over 20%, such as 25% and more calculated on the weight of the cellulose, though there is no advantage in using larger quantities than 25%. On the other hand, the quantities of condensing agent can be reduced to any smaller amounts, such as 10%, 5%, 2% or less.

By varying the amount of condensing agent, products with different solubilities and other properties can be obtained. The order or manner in which the respective materials are brought together or incorporated in carrying the invention into effect may be varied in any suitable or desired way.

The reaction according to the present invention may also be executed in suspension, in which case the cellulose is preferably treated beforehand with a mixture of the increased quantity of acetic acid or corresponding solvent or solvent mixtures containing the condensing agent, and afterwards introduced into a mixture of the necessary quantity of the acetic anhydride and a given non-solvent diluent, like benzol or carbon tetrachloride or any other suitable diluent employed in sufficient quantity to prevent solution of the cellulose.

In order to speed up the reaction the cellulose or cellulose conversion product may receive a pretreatment with concentrated or dilute acetic acid or other organic (fatty) acid at ordinary temperature or with cooling or at elevated or even boiling temperatures. The acid, preferably, should contain small quantities of sodium acetate or other suitable agents capable of neutralizing any mineral acid which may be present, since the latter would have a destructive effect on the cellulose molecule particularly when a high temperature is used. The duration of this treatment and the temperatures utilized will depend on the acid used and its concentration. The details of this pretreatment are here omitted since it forms the subject matter of a divisional application.

The following is an example of the manner in which the process can be carried out but the invention is not to be considered as limited to this example.

*Example*

100 parts by weight of cellulose, for example cotton, are introduced into a mixture obtained by mixing 800 to 1200 parts by weight of glacial acetic acid, 15 to 20 parts by weight of sulphuric acid and 6.5 to 9 parts of anhydrous sodium carbonate (or an equivalent quantity of sodium acetate), and afterwards adding about 200 to 250 parts by weight of acetic anhydride, the temperature is allowed to rise gradually, cooling (conveniently by water) being continued until complete solution. If desired the temperature towards the end of the reaction may be allowed to rise to 25° or 30° C. or even somewhat more to finish the reaction. After the solution becomes clear, one can heat gently, for completing the reaction. The solution so obtained is just as viscous, in spite of the much greater dilution, as an acetylation made with less dilution, and the acetylation product contained in it is consequently much more viscous than hitherto known. The product can be isolated and employed as such or be submitted to a secondary or further treatment either in the original acetylation solution or after isolation therefrom. The isolation of the product from the acetylation solution may be effected by precipitating it in water or with diluents such as carbon tetrachloride or so forth.

In the foregoing example, when 15 parts of sulfuric acid are employed together with 6.5 parts of sodium carbonate, the sodium carbonate reacts with 12 parts of sulfuric acid to form 14.5 parts of sodium bisulphate which contains 3 parts of free sulfuric acid, so that the condensing agent used is a bisulphate containing about 20% of its weight of free sulfuric acid.

The reaction goes more slowly in proportion as the quantity of condensing agent is reduced, and in such case more acetic anhydride may be employed.

The primary cellulose acetates obtained according to the present invention can either be used directly as such for any technical purposes, like the manufacture of artificial silk celluloid-like masses, films, varnishes, etc., especially when they are directly soluble in acetone or dilute acetone; or they may be first submitted to a further or secondary treatment or reaction either in the original esterification solution or after isolation therefrom, and either in solution or suspension.

Such further or so called secondary treatment may be along the lines indicated in my British Patents 20,977/1911, and 20,852/1912 or my U. S. Patents 1,217,722, and Reissue 14,338.

In these patents as referred to I have shown how the primary esterification products or other esterification solutions or otherwise made up solutions or suspensions of these products can be thus transformed by using the direct acetylation solutions or other solutions or suspensions of the primary esterification product, with or without the addition of water or other similarly acting agents having the effect of destroying the acetic anhydride, and which at the same time should preferably be able to be themselves esterified without producing water in any way, even intermediately, as for instance lactic acid (the absence of water in the treatment, or the quantity of water or similarly acting agents used directing the phases of solubilities passed through).

More particularly the condensing agent may be neutralized partially or completely and the secondary treatment may then be effected, either at ordinary temperature or at a higher temperature that is to say, in the presence of free organic acids only, as explained in my U. S. Patent 1,217,722, page 4, lines 119, 120–129.

Furthermore, as shown in my said patents the weaker the condensing agent the more water or similarly acting agents one can use in the secondary reaction for getting given phases of solubilities. However, the use of less water or similarly acting agents or no water or similarly acting agents may be resorted to for passing through many more phases of solubilities more slowly and therefore more distinctly.

It is to be understood, however, that the various solubilities developed in the secondary reaction or treatment of the products of the present invention do not necessarily correspond to those developed in the products obtained according to my said previous U. S. reissue Patent 14,338 and Patents 1,278,885, 1,280,974 and 1,280,975 and my British Patents 20,977/1911, 14,101/1915, 6,463/1915 and 100,009.

Further any other processes of secondary reaction or further treatment may be applied to the primary esterification products obtained according to the present invention.

What I claim and desire to secure by Letters Patent is:—

1. Process for the manufacture of cellulose acetate, characterized in that the acetylation of cellulose is performed with acetic anhydride and a weak condensing agent which is a salt of sulphuric acid in presence of a quantity of an organic solvent, non-esterifiable by fatty acid anhydride over 8 times the weight of the cellulose.

2. Process for the manufacture of cellulose actate, characterized in that the acetylation of cellulose is performed with acetic anhydride and a weak condensing agent which is a salt of sulphuric acid in presence of a quantity of acetic acid over 8 times the weight of the cellulose.

3. Process for the manufacture of cellulose acetate, characterized in that the acetylation of cellulose is performed with acetic anhydride and a bisulphate in presence of a quantity of an organic solvent non-esterifiable by acetic anhydride, over 8 times the weight of the cellulose.

4. Process for the manufacture of cellulose acetate, characterized in that the acetylation of cellulose is performed with acetic anhydride and a bisulphate in presence of a quantity of acetic acid over 8 times the weight of the cellulose.

5. Process for the manufacture of cellulose acetate, characterized in that the acetylation of cellulose is performed with acetic anhydride and a bisulphate containing a small proportion of free sulphuric acid in presence of a quantity of an organic solvent, non-esterifiable by acetic anhydride over 8 times the weight of the cellulose.

6. Process for the manufacture of cellulose acetate, characterized in that the acetylation of cellulose is performed with acetic anhydride and a bisulphate containing a small proportion of free sulphuric acid in presence of a quantity of acetic acid over 8 times the weight of the cellulose.

7. Process for the manufacture of cellulose acetate, characterized in that the acetylation of cellulose is performed with acetic anhydride and a weak condensing agent in presence of a quantity of acetic acid over about 12 times the weight of the cellulose.

8. Process for the manufacture of cellulose acetate, characterized in that the acetylation of cellulose is performed with acetic anhydride and a weak condensing agent in presence of a quantity of acetic acid over about 15 times the weight of the cellulose.

9. Process for the manufacture of cellulose acetate, characterized in that the acetylation of cellulose is performed with acetic anhydride and a weak condensing agent which is a salt of sulphuric acid in presence of a quantity of acetic acid over about 12 times the weight of the cellulose.

10. Process for the manufacture of cellulose acetate, characterized in that the acetylation of cellulose is performed with acetic anhydride and a bisulphate in presence of a quantity of acetic acid over about 12 times the weight of the cellulose.

11. Process for the manufacture of cellulose acetate, characterized in that the acetylation of cellulose is performed with acetic anhydride and a bisulphate in presence of a quantity of acetic acid over 8 times the weight of the cellulose, under such conditions that the temperature does not rise above about 35° C. during acetylation.

12. Process for the manufacture of cellulose acetate, characterized in that the acetylation of cellulose is performed with acetic anhydride and a bisulphate containing a small quantity of free sulphuric acid in presence of a quantity of acetic acid over 8 times the weight of the cellulose, the acetylation being conducted with water cooling so that the temperature does not rise above about 35° C. during acetylation.

13. Process according to claim 5, characterized by the acetylation being conducted with water cooling so that the temperature does not rise above about 35° C. until the solution becomes clear, and then with heating to complete the acetylation.

14. Process for the manufacture of cellulose acetate, characterized in that the acetylation of cellulose is performed with acetic anhydride and a bisulphate in presence of a quantity of acetic acid over 8 times the weight of the cellulose, and the resulting cellulose acetate is subjected to further treatment in presence of an acetic anhydride destroying agent to modify the solubility characteristics thereof.

15. Process for the manufacture of cellulose acetate, characterized in that the acetylation of cellulose is performed with acetic anhydride and a bisulphate containing a small proportion of free sulphuric acid in presence of a quantity of acetic acid over 8 times the weight of the cellulose, the acetylation being started at a temperature between about 0° C. and ordinary temperature.

16. Process for the manufacture of cellulose acetate, characterized in that the acetylation of cellulose is performed with acetic anhydride and a bisulphate containing a small proportion of free sulphuric acid in presence of a quantity of acetic acid over 8 times the weight of the cellulose, the acetylation mixture being pre-cooled to below ordinary temperature and the temperature not exceeding about 35° C. during acetylation.

In testimony whereof I have hereunto subscribed my name.

HENRY DREYFUS.